April 21, 1964   TAKEFUSA KIKUCHI   3,129,923
CLAMPING DEVICE FOR A LOAD LIFTING FRAME
Filed Jan. 30, 1962   2 Sheets-Sheet 1
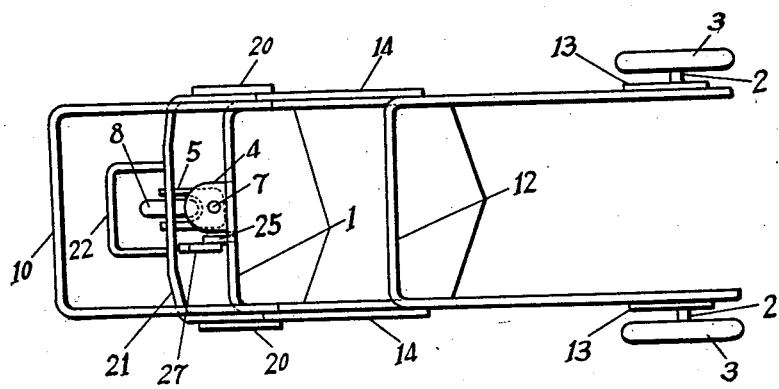
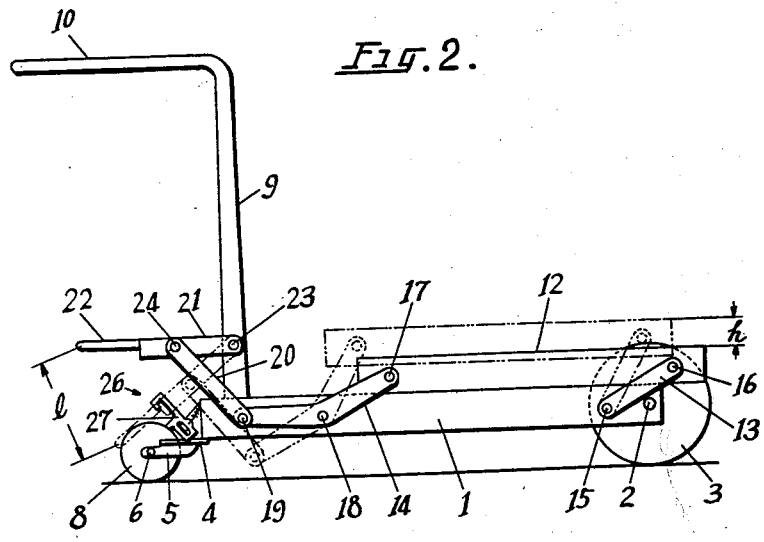

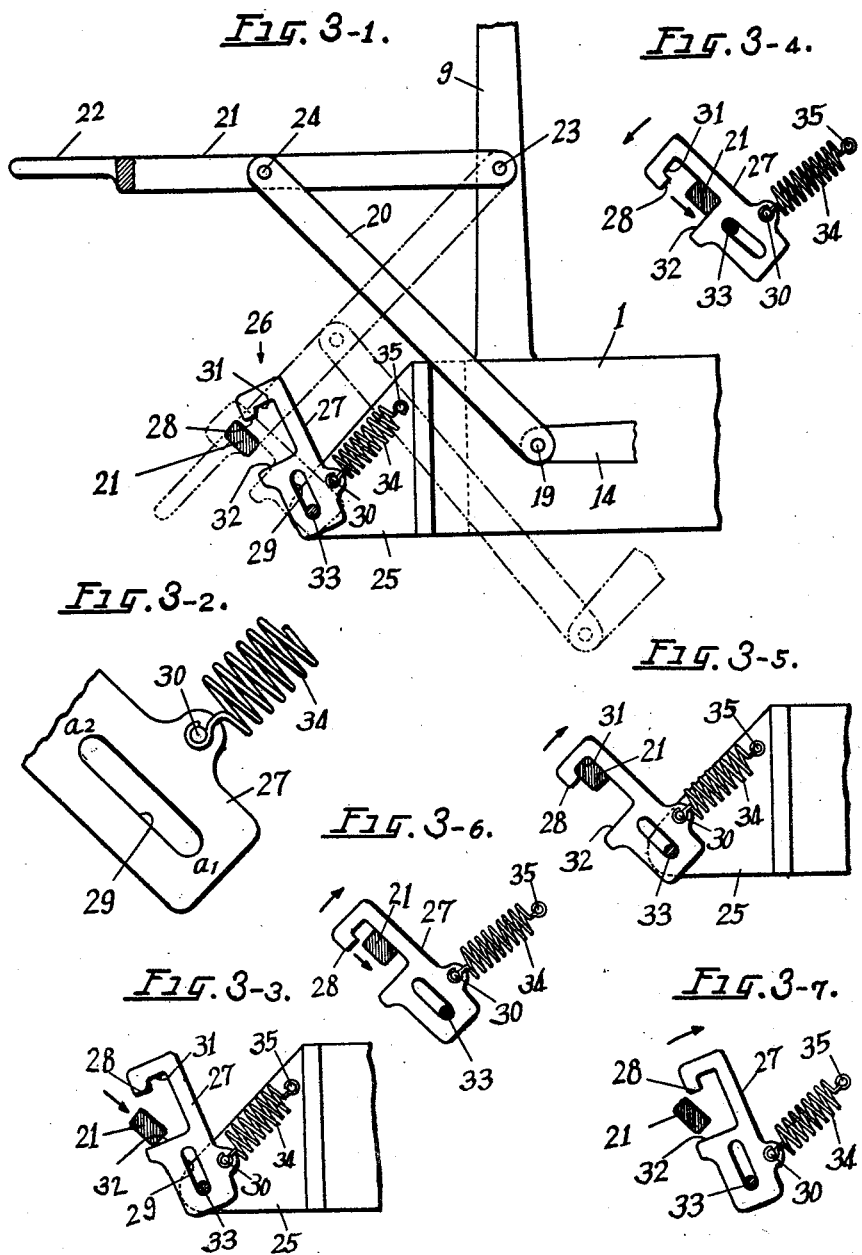

United States Patent Office 3,129,923
Patented Apr. 21, 1964

3,129,923
CLAMPING DEVICE FOR A LOAD
LIFTING FRAME
Takefusa Kikuchi, Tokyo, Japan, assignor to Taiyu Shoji Kabushiki Kaisha, Tokyo, Japan
Filed Jan. 30, 1962, Ser. No. 169,898
1 Claim. (Cl. 254—10)

This invention relates to a hand truck with a load lifting apparatus, equipped with an automatic clamping device to engage so as to hold the lifting apparatus in its lifted position, and to disengage when the truck is to be unloaded.

The features of this invention are that the loading and unloading are operated only by stepping downwards and upwards by a foot on the pedal, and the engaging and disengaging of the clamp device are each operated automatically by a simple stepping down motion also on the same pedal.

The invention is illustrated in the accompanying drawings, in which—

FIG. 1 is a plan view of the truck of this invention.
FIG. 2 is a side elevation of FIG. 1.
FIG. 3-1—FIG. 3-7 are side elevations of the automatic clamping device, showing its functions.

The truck chassis consists of a horizontal main frame 1 of U shape in plan view, a pair of front wheels 3 mounted on a pair of axles 2 which are fixed on the main frame, a rear wheel 8 mounted on an axle 6 fixed on a bracket 5 which is vertically pin jointed to a bracket 4 fixed horizontally to the rear part of the main frame 1, and a handle 10 fixed on a pair of stanchions 9 rigidly fixed on the main frame towards its rear end.

A loading frame 12 of U shape in plan view is provided above the main frame 1 and is connected to the main frame by two pairs of levers 13 and 14 through four pairs of pins 15, 16, 17 and 18, so that a pair of quadrilaterals composed by the loading frame, main frame and, levers 13 and 14 through pins 15, 16, 17 and 18 are a pair of parallelgrams.

Besides two pin holes for pins 17 and 18, each of the levers 14 has another hole for a pin 19, on which a connecting bar 20 is to be jointed, as will be described later.

A lifting lever 21 of U shape in plan view is jointed at the ends to a pair of stanchions 9 through a pair of pins 23.

The lifting lever 21 and the levers 14 are connected on each side by a pair of connecting bars 20 through a pair of pins 24 provided on the lifting lever, and the pins 19 already described. A pedal 22 is rigidly fixed on the lifting lever 21.

The lifting apparatus as above described, is so arranged that the lifting lever 21 is horizontal when the loading frame 12 is at its lowest position, as shown by full lines, and when the pedal is stepped downwards a distance $l$ to its lowest position, the loading frame 12 will be lifted to its highest position by a height $h$, as shown by chain lines in FIG. 2.

As already described, the loading frame 12 composes a parallelogram with the main frame 1, bars 13 and 14, it is clear that the loading frame always is disposed horizontal and parallel to the main frame 1. This means that the load on the loading frame is always horizontal at any position.

The total lever ratio $l/h$ of the lifting mechanism between the pedal 22 and the loading frame 12 can be made large enough to lift a heavy load by a small stepping down force on the pedal.

Thus by the lifting device as above described, heavy loads may be lifted by a small manual stepping force.

Now, another important feature for a lifting hand truck is to easily clamp the loading frame to the lifted position and to easily disengage the clamp when the truck is to be unloaded.

In the drawing FIG. 3-1, 26 is the general side view of the clamping device, equipped on a bracket 25 which is fixed on the rear side of the lateral part of the main frame 1. The clamping device 26 consists of a latch 27 and a tension coil spring 34.

The latch 27 has, toward one of its ends, a longitudinal groove 29, slidably engaged with a pin 33, fixed on a bracket 25 which is fixed on the rear side of the lateral part of the main frame 1; while the other end of the latch has a pair of jaws, the upper 31 and the lower 32. The lower jaw 32 is plane, while the upper 31 has a hook 28 as shown in FIG. 3-3.

The tension coil spring 34 is supported by a pin 35 fixed on the bracket 25 at one end to pull the latch 27 through a pin 30 fixed on the latch. This pin 30 is so fixed on the latch so that its center is on the straight line which bisects perpendicularly the long axis $a$, $a_2$ of the groove 29, as shown in FIG. 3-2.

By this arrangement, the latch 27 is pulled by the spring 34 to turn clockwise, when the pin 33 is on the lower end of the groove 29, and the latch is pulled by the spring to turn counterclockwise, when the pin is on the upper end of the groove.

The lifting lever 21 is always pushed upward by the weight of the loading frame 12, either when loaded or unloaded, and when unloaded, takes the position as shown by full lines in FIG. 1 and FIG. 3-1.

Load transportation by a truck with a construction and mechanism as above described, will be operated as follows:

An operator applies the truck to a loaded bucket so as to let the loading frame 12 go under the rim of the bucket, and he steps down on the pedal 22 to lower the lifting lever 21, until at first its transverse part begins to push the latch 27 downwards at its lower jaw as shown in FIG. 3-3, and until at last the latch 27 is pushed down to its lowest position and is stopped by the pin 33 as shown in FIG. 3-4. At this position, it is clear that the upper end of the groove 29 of the latch touches the pin 33, and therefore, that the latch is pulled by the spring 34 to turn counterclockwise to be stopped by the transverse part of the lifting lever 21 as shown in FIG. 3-4.

The loading frame 12 loaded with the bucket is thus lifted to its highest position.

The operator then takes his foot off the pedal. The lifting lever 21 is then, as already explained, pulled back upwards by the load, and pushes the latch 27 at its upper jaw 31 until the lower end of the groove 29 touches the pin 33 so that the lifting lever is stopped by the upper jaw, as shown in FIG. 3-5. At this position, the spring 34 pulls the latch 27 to turn it clockwise as already described. But the hook 28 on the upper jaw of the latch 27 prevents the latch from turning, and thus the lever 21 is clamped steadily as it is as shown in FIG. 3-5 and by chain line in FIG. 3-1. Thus the loaded loading frame is held steadily at the lifted position, as shown by chain lines in FIG. 1.

Now the operator may push or pull the handle 10 to convey the loaded truck.

When the truck has been conveyed to a desired place, the operator unloads the truck as follows:

He holds the handle 10 and steps down again on the pedal 22 a little. Then, as above described, by the clockwise turning force acting on the latch 27, as soon as the upper edge of the lever 21 gets out of the hook 28 as shown in FIG. 3-6, the latch is turned clockwise as shown in FIG. 3-7, and the lever 21 is now free out of the latch.

Then the operator steps the pedal back to let down the loaded bucket on the place as desired, to complete the operation.

It is to be noticed, that, as above described, the loading and unloading are operated only by stepping downwards and upwards by a foot on the pedal, and the engaging and disengaging of the clamp device are accomplished automatically by a simple stepping down motion also on the same pedal. These features are the most important characteristics of this invention.

I claim:

In a hand truck with a load lifting frame, and a foot pedal for raising the lifting frame through a mechanical linkage, an improved clamping device for locking the foot pedal of the hand truck in a position corresponding to the raised position of the lifting frame comprising:

(a) a latch having a C-shaped upper end for locking the foot pedal and a longitudinally slotted lower end;

(b) a pivot pin slidably mounted in the slotted lower end of the latch and pivotally connecting the latch to the truck;

(c) a spring connected at one end to the truck and at the other end to the latch adjacent a central portion of the longitudinal slot, so that the spring urges the latch to a locking position with respect to the foot pedal when the pivot pin is in the upper half of the longitudinal slot, and to an unlocking position when the pivot pin is in the lower half of the longitudinal slot.

References Cited in the file of this patent

UNITED STATES PATENTS

| | | |
|---|---|---|
| 940,565 | Temple | Nov. 16, 1909 |
| 1,744,894 | Hibbard | Jan. 28, 1930 |
| 2,511,073 | McCandless | June 13, 1950 |